United States Patent Office 2,857,439
Patented Oct. 21, 1958

2,857,439
DEHYDROGENATION OF SULFUR-CONTAMINATED MONOCYCLIC TERPENES

Arthur L. Glasebrook, Wilmington, Del., assignor to Hercules Powder Company, Wilmington, Del., a corporation of Delaware No Drawing. Application June 20, 1955
Serial No. 516,779

6 Claims. (Cl. 260—668)

The present invention relates to the catalytic dehydrogenation of terpenes. More particularly, the invention relates to the production of p-cymene by the vapor phase dehydrogenation of such monocyclic terpenes as dipentene, limonene, terpinolene, the terpinenes and the like in the presence of a platinum catalyst and in the presence of hydrogen.

Several years ago p-cymene achieved importance as an intermediate in the production of various styrene derivatives and as an intermediate in the preparation of thymol and methol. Because of the increased demand for p-cymene at that time, the art investigated and devised several successful processes for the conversion of monocyclic terpenes, such as dipentene, to p-cymene according to the theroretical equation:

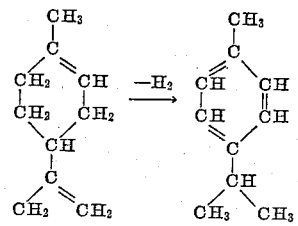

While the reaction is customarily referred to as a dehydrogenation reaction, it is understood that some disproportionation is also involved. However, in keeping with the practice of the art, the term "dehydrogenation" is used herein.

In a typical prior art process for the dehydrogenation of a monocyclic terpene, the terpene is vaporized and passed into contact with a heated catalyst body and the effluent vapors are condensed to give a liquid product comprising predominantly p-cymene. Many catalysts have been used successfully but the most widely used catalyst has been palladium.

The prior art methods for the production of p-cymene have been used commercially for many years on terpene mixtures, obtained from pine wood extracts, which are relatively free from sulfur. In recent years, however, the demand for p-cymene has further increased so that it has been found necessary to employ as feeds terpenes of sulfate turpentine origin which are contaminated with deleterious amounts of sulfur. When it was tried to use these sulfur-contaminated terpenes as feeds in the prior art processes, the results were highly unsatisfactory because the sulfur was found to contaminate or poison the catalyst which resulted in an extremely short catalyst life.

In view of the unsuitabiblity of the prior art processes for the production of p-cymene from sulfur-contaminated monocyclic terpenes, it is the primary object of the present invention to provide a process which permits the use of such sulfur-contaminated terpenes as feeds without appreciable shortening of the life of the catalyst.

According to the present invention, it has been discovered that sulfur-contaminated monocyclic terpenes may be dehydrogenated to p-cymene by a process which comprises vaporizing a sulfur-contaminated monocyclic terpene, passing said vaporized terpene in the presence of hydrogen into contact with a catalyst comprising platinum supported on a carrier of high surface activity maintained at a temperature of from about 200–500° C. whereby a major portion of the terpene is converted to p-cymene, and condensing the reacted vapors to obtain a liquid product comprising predominantly p-cymene.

The process of the invention has been found to be operable for extended periods of time without excessive decline in the activity of the catalyst despite the sulfur present in the feed. Furthermore, high yields of p-cymene are obtainable and the process is not susceptible to harm by terpene alcohols or bicyclic or acyclic terpenes contained in the feed. While the exact reasons for the success of the process are not known, it is presumed that the hydrogen present in the reaction zone in some way counteracts the normal deleterious effects of sulfur. It is noteworthy in this connection that among all the catalysts which have been used heretofore for the dehydrogenation of monocyclic terpenes only the supported platinum catalysts can be used successfully in this invention.

In order to further describe the invention, the following examples are presented. Parts and percentages are by weight unless otherwise specified.

EXAMPLE 1

In this example, a terpenic mixture of sulfate turpentine origin was dehydrogenated to produce p-cymene. The feed comprised 55–60% of dipentene, 5% of α-terpinene and 5% of menthadienes including 2,4(8)-p-menthadiene and 3,8(9)-p-menthadiene. The balance of the feed was predominantly p-menthane and camphene in undetermined relative amounts. The feed was contaminated by 38 p. p. m. of combined sulfur.

The catalyst used was a commercial platinum-on-activated alumina catalyst in which the weight of platinum comprised 0.5% of the total weight of catalyst. It had been prepared by impregnation of activated alumina with an aqueous solution of chloroplatinic acid followed by drying and then reduction at an elevated temperature in a stream of pure hydrogen.

The apparatus used in the example comprised a feed pump, a vaporizer, a heated tubular reaction vessel, and means for condensing the vapors emitted from the reaction vessel. A fixed bed of the catalyst was maintained within the tubular reaction vessel.

In operation, the reaction vessel was flushed with nitrogen and the catalyst heated to a temperature of 350° C. The feed was pumped into the vaporizer at the rate of 1 v. v. h. (liquid volume per bulk volume of catalyst per hour). The vaporized feed was next mixed with an equimolar amount of hydrogen and passed through the reaction vessel. The vapors emitted from the reaction vessel were condensed and recovered as product.

The reaction was run for a period of 25 hours and examinations of the product were made at the start of the run and at the end of the 25 hour period to determine the nature of the product and the rate of decline in catalyst activity. The following data were obtained:

Product

| | Bromine Number | $n_D^{30}$ | Percent p-Cymene |
|---|---|---|---|
| Start | 6 | 1.4826 | 86 |
| Finish | 9 | 1.4822 | 86 |

The data show clearly that the catalyst maintained its activity substantially constant throughout the run and that a product of high p-cymene content was obtained.

EXAMPLE 1A

This example is included to show that the results obtained using the sulfur-contaminated feed of Example 1 are comparable to those obtained using a feed that contains substantially no sulfur. In this case, the feed contained less than 2 p. p. m. of sulfur and was a terpene mixture of pine wood origin comprising about 45% dipentene, 3% α-terpinene, 2% 3,8(9)-p-menthadiene, 14% p-cymene, 4% terpinolene, with the balance predominantly p-menthane.

The reaction was carried out for a period of 125 hours under substantially the same conditions as that of Example 1 and the following data were obtained by examination of the product obtained at the start and at the finish of the reaction:

*Product*

|        | Bromine Number | $n_D^{30}$ | Percent p-Cymene |
|--------|---------------|-----------|------------------|
| Start  | 2             | 1.4838    | } Range: 77–78.  |
| Finish | 4             | 1.4794    |                  |

The data, taken in comparison with the data of Example 1, show that the sulfur present in the feed of Example 1 had substantially no effect on the extent of the reaction or on the activity of the catalyst.

EXAMPLE 1B

In this example, two runs were made using the feeds of Example 1 and of Example 1A, respectively, and using a commercial palladium-on-activated alumina catalyst prepared by impregnating alumina with an aqueous solution of palladium chloride followed by drying and reduction with hydrogen to give a catalyst analyzing 1.25% palladium. The reaction conditions were identical to those of Example 1. The data obtained in the two runs were as follows:

| Run No. | Run Duration (hrs.) | Bromine Number | | $n_D^{30}$ | |
|---------|---------------------|----------------|-------|-----------|--------|
|         |                     | Start          | Finish | Start    | Finish |
| 1 (sulfur-free feed) | 37 | 3 | 4 | 1.4796 | 1.4770 |
| 2 (sulfur-contaminated feed) | 27½ | 5 | 25 | 1.4787 | 1.4712 |

The relatively large changes in bromine number and refractive index of the product during the second run show conclusively that the catalyst suffered from loss in activity which can be explained only by the difference in sulfur contents of the feeds. A supported palladium catalyst is thus inoperable for use in the process of the invention.

EXAMPLE 2

This example was performed according to the procedure of Example 1 using the same feed but substituting a commercial platinum-on-silica catalyst prepared by the impregnation of silica gel with an aqueous solution of chloroplatinic acid followed by drying and reduction with hydrogen. The platinum content of the catalyst was 0.6%. The data obtained by analyzing the product obtained at the start and at the finish of the reaction are as follows:

*Product*

|        | $n_D^{30}$ | Percent p-Cymene |
|--------|-----------|------------------|
| Start  | 1.4831    | 85               |
| Finish | 1.4806    | 82               |

It is evident from the data that the activity of the catalyst remained at a high level throughout the reaction and would be capable of continued operation for a substantially longer period of time.

EXAMPLE 3

Two runs were made according to the procedure of Example 1 employing the same feed. In one run the catalyst comprised 0.3% platinum and in the other, 1% platinum. The product data were as follows:

| Platinum Content | Run Duration (hrs.) | Bromine No. | | $n_D^{30}$ | | Percent p-Cymene | |
|------------------|---------------------|-------------|--------|-----------|--------|-----------|--------|
|                  |                     | Start       | Finish | Start     | Finish | Start     | Finish |
| 0.3%             | 22                  | 1           | 1      | 1.4816    | 1.4813 | 90        | 89     |
| 1.0%             | 30                  | 2           | 7      | 1.4813    | 1.4815 | 88        | 86     |

The results are comparable to those obtained in Example 1 and show that variation of the platinum content of the catalyst within the limits tested has no significant effect on the reaction.

EXAMPLE 4

In this example, the reactor was a vessel approximately 8.5 inches in diameter by 20 feet high having a calculated volume of 7.78 cubic feet. Initially, the reactor was filled with 400 lb. of a commercial platinum-on-activated alumina catalyst identical to that employed in Example 1.

The reactor was operated continuously for 7 days using as the feed a mixture composed essentially of monocyclic terpenes analyzing approximately 50% dipentene, 15% terpinolene and about 15% p-cymene with the balance being predominantly p-menthane and menthadienes. The feed contained sulfur in the amount of 50 p. p. m. and had an initial bromine number of 125.

During the 7 days of operation the feed was vaporized at an average rate of about 2 v. v. h. (liquid volume per bulk volume of catalyst per hour) and fed to the reactor which was maintained at an average temperature of about 340° C. and at an average pressure of about 70 p. s. i. g. The feed rate of hydrogen during the 7 days varied from 3 to 7 c. f. m. In this manner, there was produced over the 7 day period approximately 185,000 gallons of product having an average bromine number of 2, an average refractive index of 1.4787 and an average p-cymene content of about 77%. The fact that substantially no decline in the activity of the catalyst took place is evidenced by the fact that the p-cymene content of the product on the last day of operation was 78.1%.

As has been shown in the examples, the process of the invention is operable with feeds that contain a variety of monocyclic terpenes and which contain also other hydrocarbons, such as p-menthane, which are characterized by the same carbon skeleton as the monocyclic terpenes and which are also converted to p-cymene during the reaction. In addition to terpene mixtures of the types that are processed in the examples, the invention can be applied to sulfur-contaminated monocyclic terpenes composed essentially of one compound although such relatively pure feeds will seldom, if ever, be available for commercial processing.

As formerly explained, the process is intended for operation on sulfur-contaminated feeds. Feeds of this nature are primarily of sulfate turpentine origin and may contain up to about 150 p. p. m. of sulfur. Feeds that contain less than about 2 p. p. m. of sulfur are not considered to be sulfur contaminated and can be dehydrogenated satisfactorily according to prior art processes.

In effecting the reaction, the feed is vaporized, admixed with hydrogen, and passed into contact with the catalyst. This can be accomplished in either a fixed bed or fluidized system of conventional manipulative procedures known to the art which need not be described in detail herein.

The process conditions can be varied fairly widely without interfering substantially with the formation of p-cymene in high yield and without lessening the life of the catalyst. There are, however, certain preferred conditions which should be observed if optimum results are to be obtained.

The presence of hydrogen is essential and it is preferable that hydrogen be mixed with the vaporized feed in at least an equimolar amount. Beyond this amount, an excess of hydrogen does not affect the reaction adversely but the use of an excess of hydrogen would be wasteful and it is generally avoided.

The rate of flow of the reactants is likewise subject to variation and under otherwise optimum conditions can be varied successfully from as low a flow rate as practicable up to a flow rate of about 4 v. v. h. It is, of course, desirable to employ a flow rate as high as is consistent with the obtention of an acceptable product. To illustrate the effect of varying flow rate, the process was carried out under the conditions of the second run of Example 3 at varying rates of flow. At a flow rate of 1 v. v. h., the product analyzed about 87% p-cymene, at a flow rate of 2 v. v. h., the product analyzed about 81% p-cymene, and at a flow rate of 4 v. v. h., the product analyzed about 73% p-cymene. It is thus apparent that optimum yields are obtained at a flow rate of about 1 v. v. h. but higher flow rates can be used if a product of lower p-cymene content will be satisfactory for an intended purpose. In general, it is preferred to employ flow rates varying from 1 to 2 v. v. h.

The temperature of the catalyst, which is the most convenient measure of the temperature of the reaction, is another variable which influences the yield and rapidity of the reaction. It has been found that optimum yields are obtained when the temperature varies between about 300 and 400° C., but that satisfactory yields for some purposes are obtained at temperatures as low as 250° C. or as high as 500° C. A temperature below about 250° C. or above about 500° C. is not practicable for most purposes.

The pressure at which the process is performed has little effect on the speed or degree of completion of the reaction. It is a factor, however, in the effective life of the catalyst, the higher the pressure, up to a maximum of about 750 p. s. i. g., the longer the life of the catalyst. Nevertheless, the process can be performed quite satisfactorily at atmospheric pressure with a catalyst life of several days. It is preferred to operate at a pressure from atmospheric up to about 500 p. s. i. g.

The catalysts that are useful in the invention are well known to the art and are commercially available. They can be produced by any of several conventional methods that lead to the deposition of metallic platinum on a carrier of high surface activity. Suitable carriers are those which have relatively little tendency to promote isomerization and dealkylation reactions and include activated alumina, silica gel, activated charcoal and various clays. Consistently good results have been obtained with alumina-supported catalysts and since alumina is readily available in forms ready for use, it is a preferred carrier.

The catalysts are most often prepared by impregnating the carrier with a solution of a platinum compound which is subsequently reduced to the metallic state. The catalysts, however, may be made by coprecipitation or other known techniques. The content of platinum can vary from about 0.1 to about 10% by weight of the catalyst but preferably is less than about 1% by weight for reasons of economy.

In operation of the process, the catalyst may become inactive after extended operation due to the formation of coke deposits on its surfaces. In such event, the catalyst is easily regenerated by burning off the coke deposits in a stream of oxygen or oxygen-containing gas such as air.

What I claim and desire to protect by Letters Patent is:

1. A process for the production of p-cymene which comprises vaporizing a sulfur-contaminated monocyclic terpene, passing said vaporized terpene in the presence of hydrogen into contact with a catalyst comprising platinum supported on a carrier of high surface activity maintained at a temperature of from about 200° to 500° C. whereby a major portion of the terpene is converted to p-cymene, and condensing the reacted vapors to obtain a liquid product comprising predominantly p-cymene.

2. The process of claim 1 in which said monocyclic terpene comprises dipentene.

3. The process of claim 1 in which the catalyst comprises platinum-on-activated alumina.

4. The process of claim 1 carried out under a hydrogen pressure ranging from atmospheric up to about 500 p. s. i. g.

5. The process of claim 1 in which the temperature is between about 300° and 400° C.

6. The process of claim 5 in which the monocyclic terpene comprises dipentene and the catalyst comprises platinum-on-activated alumina.

References Cited in the file of this patent

UNITED STATES PATENTS

| | | |
|---|---|---|
| 2,402,898 | Kirkpatrick | June 25, 1946 |
| 2,411,726 | Holroyd et al. | Nov. 26, 1946 |
| 2,560,329 | Brandon | July 10, 1951 |
| 2,664,404 | Blatz et al. | Dec. 29, 1953 |